United States Patent
Zapata

(10) Patent No.: US 10,667,526 B2
(45) Date of Patent: Jun. 2, 2020

(54) HAND OPERATED PRESS

(71) Applicant: MU Mecanicos Unidos, S.A.S, Medellín (CO)

(72) Inventor: David Zapata, Medellin (CO)

(*) Notice: Subject to any disclaimer, the term of this patent is extended or adjusted under 35 U.S.C. 154(b) by 147 days.

(21) Appl. No.: 15/916,377

(22) Filed: Mar. 9, 2018

(65) Prior Publication Data

US 2019/0343132 A1 Nov. 14, 2019

(51) Int. Cl.
*A21C 11/00* (2006.01)

(52) U.S. Cl.
CPC ................. *A21C 11/006* (2013.01)

(58) Field of Classification Search
CPC ................. A21C 9/063; A21C 9/088
See application file for complete search history.

(56) References Cited

U.S. PATENT DOCUMENTS

| | | | | |
|---|---|---|---|---|
| 2,875,808 | A * | 3/1959 | Nelson | B21D 5/02 72/451 |
| 3,352,258 | A * | 11/1967 | Lassaulx | A21B 5/03 425/89 |
| 3,880,064 | A * | 4/1975 | Martinez | A47J 37/0611 99/349 |
| 4,794,854 | A * | 1/1989 | Swaim | A47J 19/06 100/112 |
| 6,205,914 | B1 * | 3/2001 | McCarney | A21C 11/006 425/385 |
| 7,140,864 | B1 * | 11/2006 | McCarney | A21C 11/006 425/318 |
| 7,343,854 | B2 * | 3/2008 | Nadal-Linares | A22C 7/0046 100/234 |
| 9,913,481 | B2 * | 3/2018 | McCarney | A21C 11/006 |
| 2016/0174577 | A1 * | 6/2016 | Saldana Garza | A21C 9/063 99/450.6 |

OTHER PUBLICATIONS

"IMUSA's tortilla press" https://www.amazon.com/s/?ie=UTF8&keywords=imusa+tortilla+press&tag=googhydr20&index=aps&hvadid=241892706861&hvpos=1t1&hvnetw=g&hvrand=13645542784087233244&hvpone=&hvptwo=&hvqmt=e&hvdev=c&hvdvcmdl=&hvlocint=&hvlocphy=9011912&hvtargid=kwd11009764285&ref=pd_sl_25a2ivwftr_e (last visited Jan. 25, 2018).

* cited by examiner

*Primary Examiner* — Joseph S Del Sole
*Assistant Examiner* — Thu Khanh T Nguyen
(74) *Attorney, Agent, or Firm* — Sanchelima & Associates, P.A.; Jesus Sanchelima; Christian Sanchelima

(57) ABSTRACT

A hand operated press 10 for foodstuff includes a base plate assembly 20 with a moving plate assembly 40 hingedly mounted at a predetermined points of their peripheries. An actuating arm 60 is hingedly mounted to the periphery of the base plate assembly 20 at a point opposite to where moving plate assembly 40 is hingedly mounted. A concave portion 70 in the actuating arm with a concavity facing the distal end of the moving plate comes in cammingly contact avoiding a perpendicular angle of attack. A protuberance 48 extending from the distal end 47 of the moving plate assembly 40 further ensures the cammingly contact while preventing actuating arm assembly 60 to totally collapse against the base plate assembly. A curved portion adjacent to the concave portion is prevents a user's fingers from coining in contact with the base plate assembly.

10 Claims, 8 Drawing Sheets

HAND OPERATED PRESS

BACKGROUND OF THE INVENTION

1. Field of the Invention

The present invention relates to a press for foodstuff and, more particularly, to such presses that are hand operated.

2. Description of the Related Art

Several designs for hand operated presses for foodstuff have been designed in the past. These hand operated presses are used to flatten masses of ground grains, such as corn or flour. None of them, however, include a design for the actuating arm that drives the moving plate in a press to avoid a locking action when the relative angular disposition of the actuating arm and the moving plate approaches 90 degrees. And furthermore, none provides for protection of a user's hand or fingers as the actuating plane approaches the plane of the moving plate.

For example, see IMUSA's tortilla press 8 inches wide, sold through Amazon, like in all the other manual tortilla presses, the actuating arm is substantially straight. https://www.amazon.com/s/?ie=UTF8&keywords=imusa+tortilla+press&tag=googhydr20&index=aps&hvadid=241892706861&hvpos=ltl&hvnetw=g&hvrand=13645542784087233244&hvpone=&hvptwo=&hvqmt=e&hvdev=c&hvdvcmdl=&hvlocint=&hvlocphy=9011912&hvtargid=kwd11009764285&ref=pd_sl_25a2ivwftr_e (last visited Jan. 25, 2018). This creates a problem when the foodstuff or product to be flattened has predetermined dimensions that brings actuating arm substantially perpendicular to the moving plate of the tortilla press. In the prior art tortilla presses the pressing operation starts typically at an angle D between the base and the moving plate of no more than 7 degrees and angle C between the base and the moving plate of 12 degrees or less corresponds to the locking position. See FIG. 4 showing the prior art tortilla press.

On the other hand, the present invention provides a press that allows the pressing operation to start at angle between the base assembly and the moving plate of up to 28 degrees corresponding to an angle A between the moving plate assembly and the base plate assembly 20 for the maximum locking position, as seen in FIG. 3.

The present invention overcomes these difficulties by providing a curved angle of attack for the actuating arm that cammingly coacts with the edge of the moving plate to avoid the locking effect that would otherwise be produce with a straight actuating arm. This also allows for larger masses of foodstuff to be pressed.

Other publications describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a tortilla press that overcomes the locking engagement of the actuating arm with the moving plate in a manual tortilla press over a range of angular positions of the moving plate with respect to the base thereby permitting the process.

It is another object of this invention to provide a tortilla press that can be readily used with ease and protects the user from hurting his or her hand when operating the press.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric representation of an embodiment for the present invention.

FIG. 2 shows an elevated side view of a press incorporating the features of the present invention with the plane of actuating arm assembly 60 at the closest position with respect to moving plate assembly 40. Protuberance 48 prevents actuating arm assembly 60 from coining close to moving plate assembly 40.

FIG. 3 is similar to FIG. 2 except that the moving plate assembly and actuating arm are raised with protuberance 48 in contact with concave portion 70 of actuating arm 60. Moving plate 40 is at a maximum operating angle A with respect to base plate 20.

V. DETAILED DESCRIPTION OF THE EMBODIMENTS OF THE INVENTION

Figure 1:
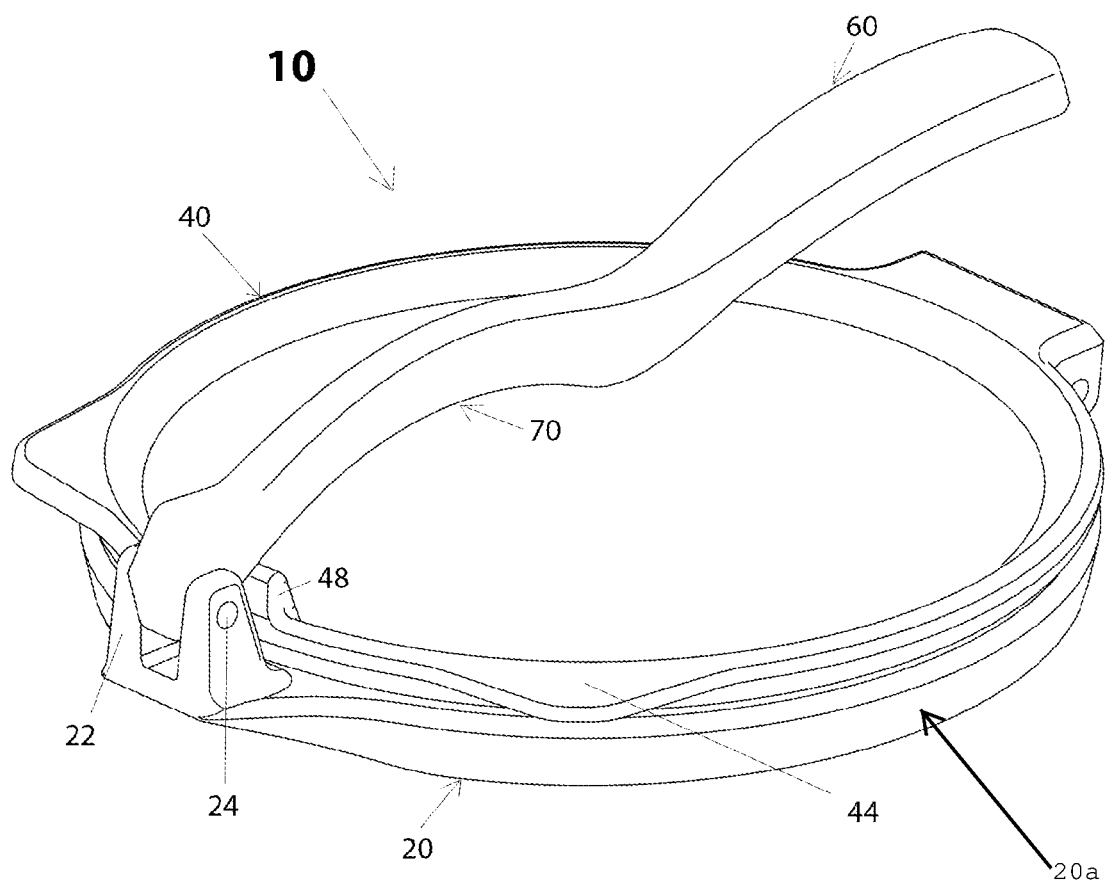
Figure 2:
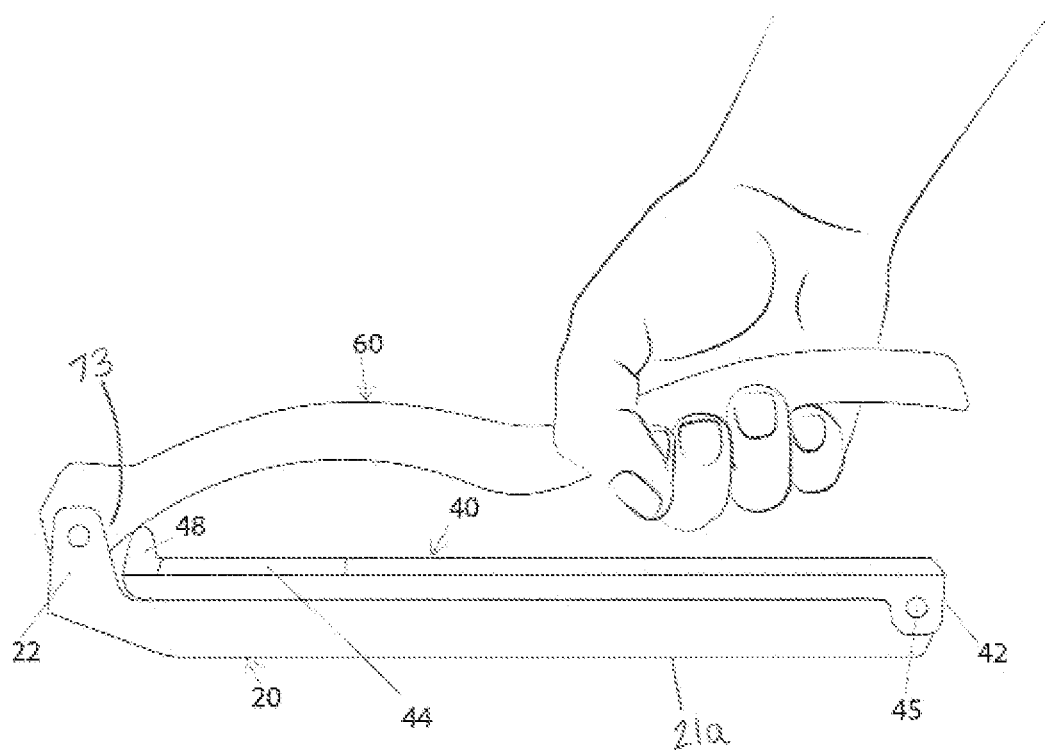
Figure 4:
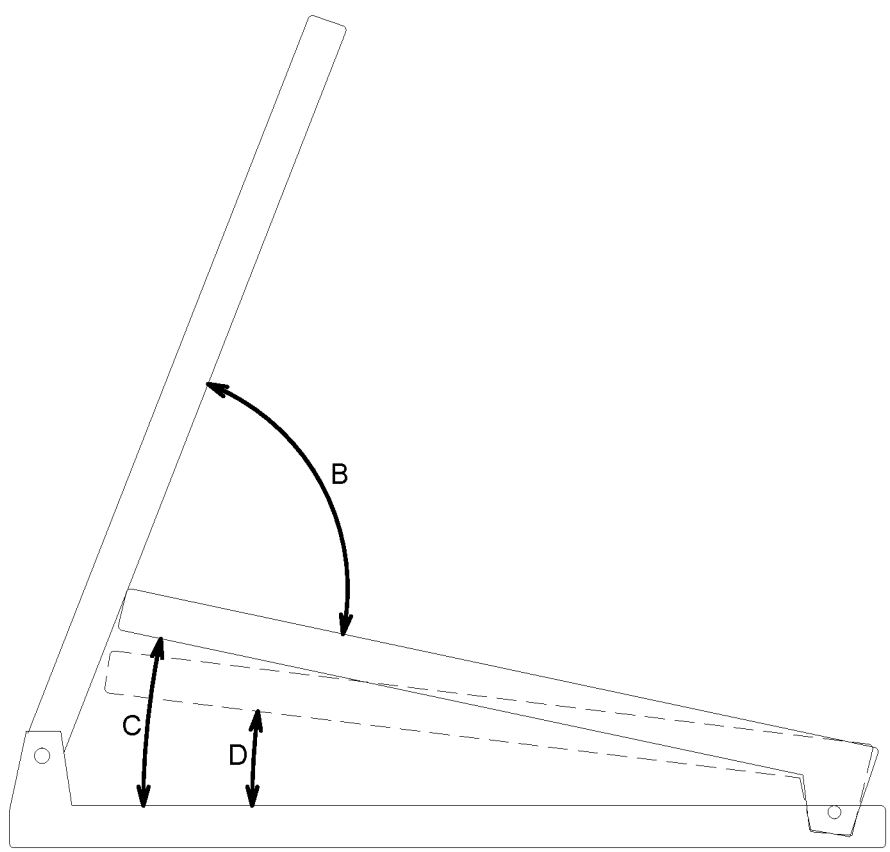
FIG. 4 illustrates a prior art press showing the maximum operating angle D and blocking angle C where the force is applied axially to the moving plate.
Figure 5:
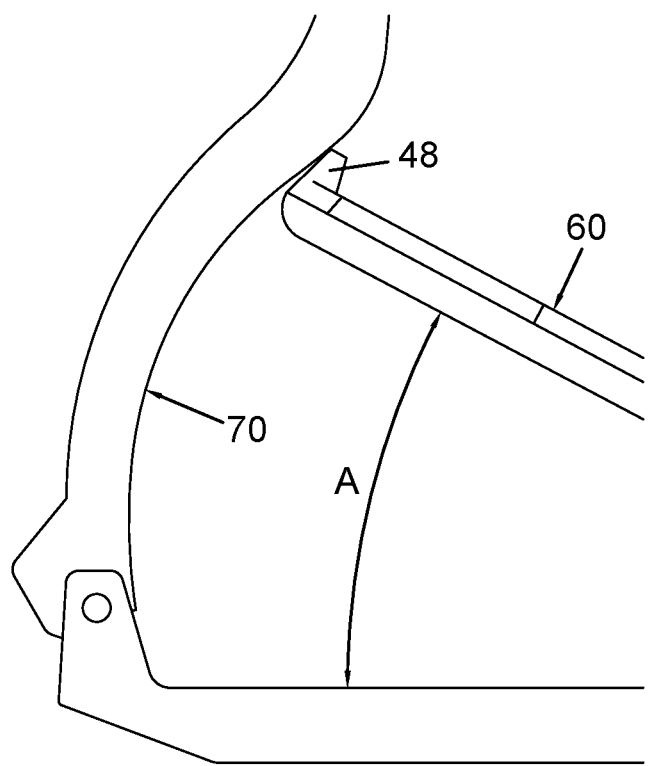
FIG. 5 is an enlarged representation of curved portion of the activating arm.

Referring now to the drawings, where the present invention is generally referred to with numeral 10 in FIGS. 1 and 2, it can be observed that it basically includes base plate 20, moving plate 40 hingedly mounted substantially at the periphery of plate 20 and actuating arm 60 hingedly mounted to plate 20 opposite to where moving plate 40 is mounted. A representation of a prior art press is shown in FIG. 4.

Figure 7:
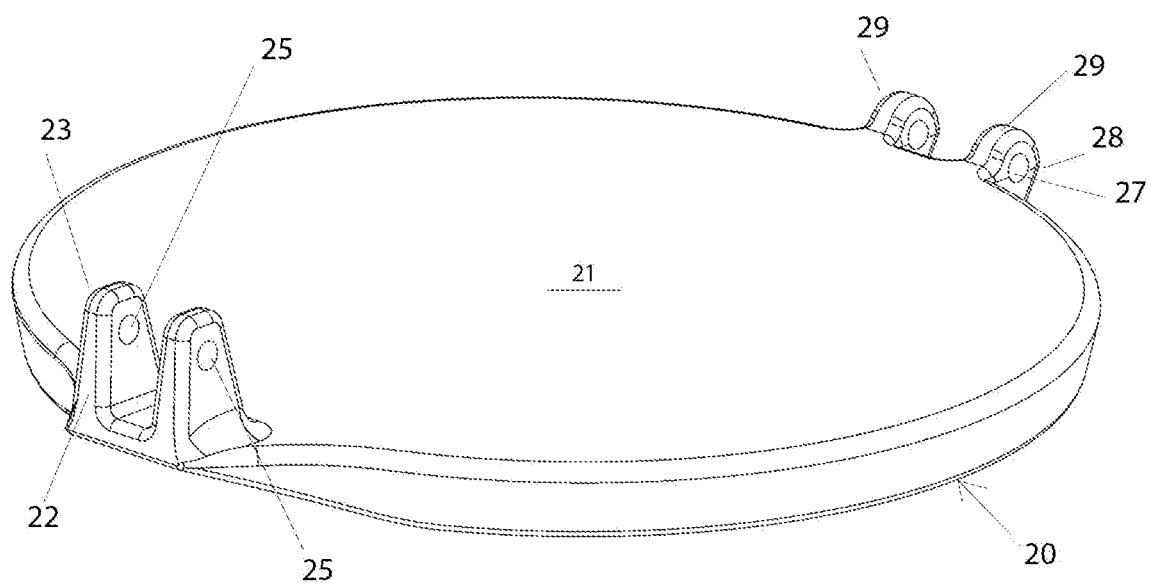
FIG. 7 is an isometric view of base plate 20.

As seen in FIGS. 1 and 2 base plate assembly 20 is designed to have an inner flat surface 21 and supportive surface 21a, preferably flat. Base plate assembly 20 is made of a sturdy material, such as iron. It has a substantially flat surface 21 where the foodstuff is placed, as seen in FIG. 7. Base plate assembly 20 includes bearing structure 22 with ears 23 having respective through openings 25. Pin 24 is passed through openings 25 as seen in FIG. 1. Bearing structure 28 is mounted at a peripheral edge 20a of base plate assembly 20 opposite to bearing structure 22, and extending outwardly from the peripheral edge, ear members 29 with through holes 27.

Figure 8:
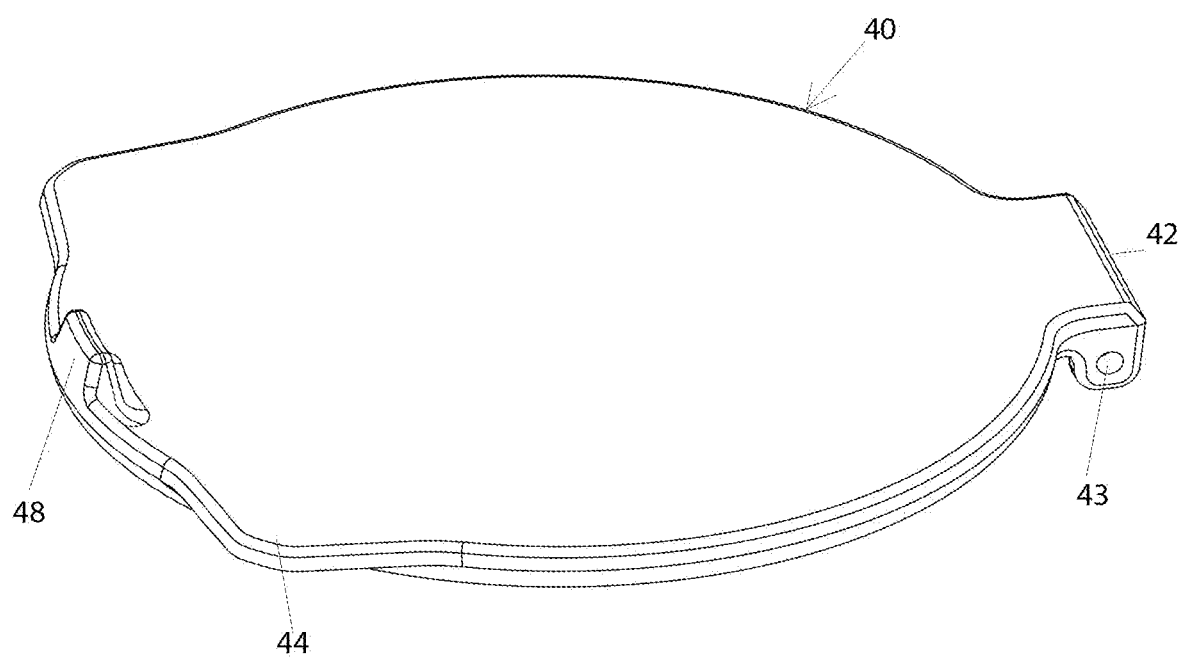
FIG. 8 is an isometric view of moving plate 40.

Moving plate assembly 40 can be made of the same sturdy material used for base plate 20 as seen in FIGS. 1 and 8. Body 42 includes through hole 43. Pin 45 to go through through hole 43 moving plate assembly 40. Assembly 40 is hingedly mounted to ear members 29 at the peripheral edge 20a of base plate 20 with hinge body 42. Opposite to hinged edge 46 is distal edge 47. It has a cooperative dimension to be almost coextensive with the dimensions of plate 20, but sufficiently shorter to coact with actuating arm 60. Tabs 44 extend outwardly from the periphery of moving plate 40 to facilitate pulling the latter away from base plate 20.

Figure 6:
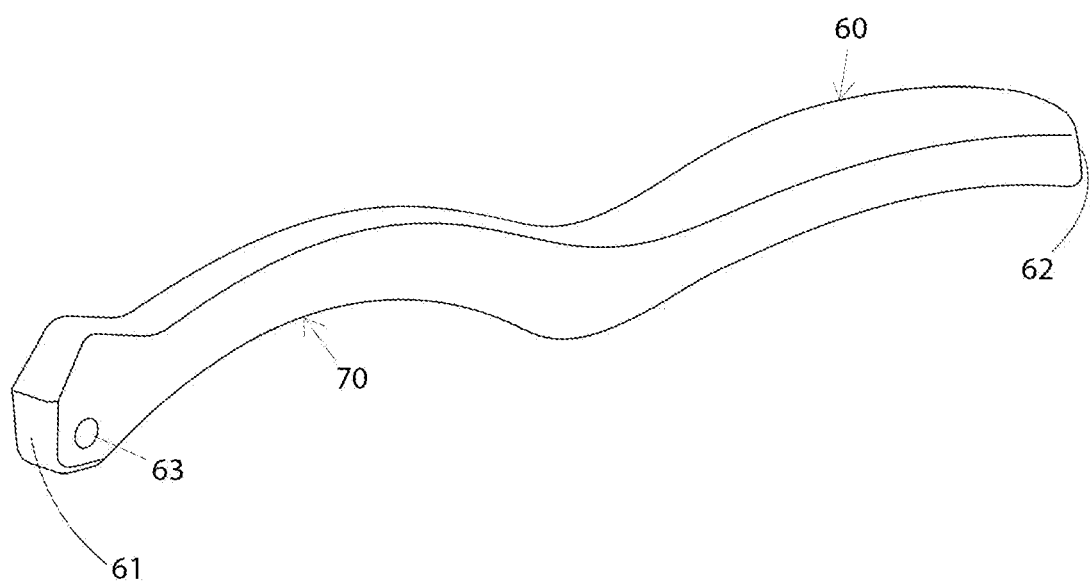
FIG. 6 is an isometric view of actuating arm 60.

Actuating arm 60 is best seen in FIG. 6. Arm 60 has two ends. Through orifice 63 is located at one end. The other end is ergonomically shaped to function as a handle. Arm 60 is elongated and has pivoting end 61 and distal end 62. Actuating arm 60 is hingedly mounted to bearing structure 22 at the periphery of base plate 20 and opposite to where moving plate 40 is hingedly mounted as seen in FIGS. 1 and 2. This permits the distal end of moving plate 40 to cammingly coact with actuating arm 60 through protuberance 48. Through orifice 63 has cooperative dimensions to cooperate with through openings 25 to allow pin 24 to pass through making pin 24 a pivoting point.

Figure 3:
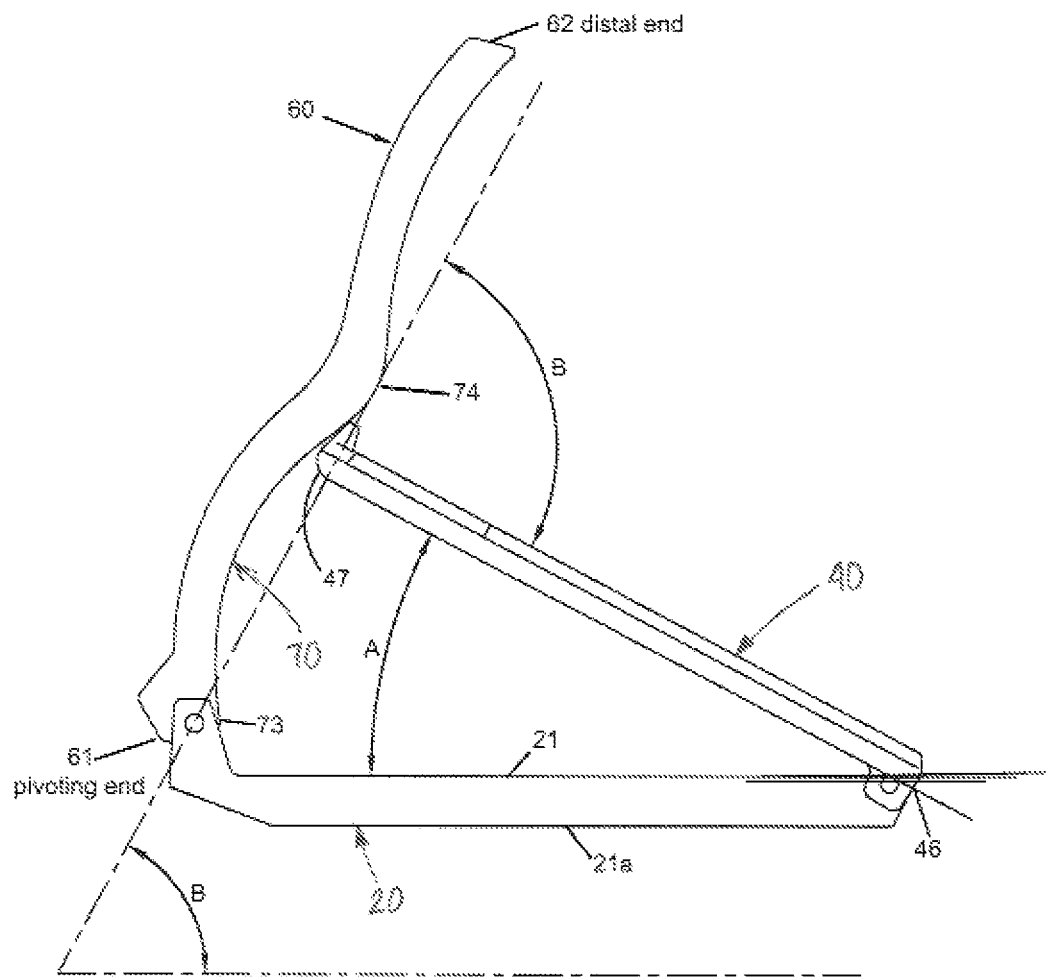

The distal end of moving plate 40 and protuberance 48, are preferably rounded to permit them to cammingly coact with the inner surface of concave or curved portion 70 of actuating arm 60 and avoiding a lock between them. As best seen in FIG. 3, actuating arm 60 includes a concave portion 70 extending from end 73 to end 74, with the surface facing moving plate 40. This curved portion 70 is intended to provide a slanted angle of attack around the area that moving plate 40 comes in contact through protuberance 48 with actuating arm 60 which is close to 90 degrees (when the two are almost perpendicular to each other). Below 90 degrees the cammingly force applied through protuberance 48 increases as angle A decreases, see FIG. 3. In one of the embodiments, protuberance 48 is provided to coact with the inner end 73 of concave portion 70 to prevent actuating arm 60 to reach the upper surface 41 of moving plate 40, as shown in FIG. 2. This prevents injury to a user's fingers.

It has been found that the prior art presses, including tortilla presses, present extreme resistance when the angular relationship B between the moving plate and the actuating arm is between 74 and 90 degrees, see FIG. 4. Many foodstuff items bring the moving plate to this relative angular position between moving plate. One alternative would be to make the base plate and moving plate considerably larger to avoid the perpendicularity they typically reach. This is not desirable for many reasons including added costs, larger foot print, and difficult to operate. However, the present invention solves this problem by accommodating curved portion 70 in the actuating arm 60 that facilitates the operation of the manual press. By avoiding a perpendicular attack angle that wastes a substantial portion of the force applied in compression, the present invention provides a curved surface that avoids this and creates a caroming effect even when the moving plate 20 is substantially perpendicular with respect to actuating arm 60.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hand operated press, comprising:
    A) a base plate assembly having a first surface resting on a supporting surface and a substantially flat second surface opposite to said first surface, said base plate assembly including a peripheral edge and a first bearing structure mounted at a predetermined location along said peripheral edge and further including a second bearing structure mounted to said peripheral edge at a predetermined location opposite to said predetermined location;
    B) a moving plate assembly having substantially the same dimensions as said base plate assembly and being hingedly mounted to said first bearing structure and including a substantially flat third surface that is selectively brought in abutting contact with said second surface and said moving plate assembly including a distal edge; and
    C) an actuating arm assembly having first and second ends said first end being hingedly mounted to said second bearing structure, said actuating arm assembly including a concave portion extending from said first end a predetermined distance towards said second end, the concave portion is selectively brought in cammingly contact with said moving plate assembly's distal edge when the axis of said actuating arm assembly and the plane of said moving plate assembly are within an angular relationship range with the moving plate assembly's distal edge is in contact with said concave portion between the ends of concave portion to provide a slanted angle of attack.

2. The press set forth in claim 1 wherein said moving plate includes a protuberance extending substantially perpendicularly away from said second surface and cammingly coacting with said concave portion.

3. The press set forth in claim 2 wherein said angular relationship includes a substantially perpendicular disposition.

4. The press set forth in claim 3 wherein said protuberance has cooperative dimensions to prevent said actuating arm assembly to be brought closer than a predetermined angular position with respect to said moving plate thereby avoiding injury to a user's fingers.

5. The press set forth in claim 4 wherein said moving plate includes at least one tab extending outwardly from the periphery of said moving plate.

6. The press set forth in claim 1 wherein said actuating arm assembly includes a curved portion extending from said second end to said concave portion, and having a cooperative curvature to permit a user's fingers grabbing said curved portion avoid coming in contact with said moving plate assembly.

7. The press set forth in claim 6 wherein said moving plate assembly includes a protuberance extending substantially perpendicularly away from said second surface and cammingly coacting with said concave portion.

8. The press set forth in claim 7 wherein said angular relationship includes a substantially perpendicular disposition.

9. The press set forth in claim 8 wherein said protuberance has cooperative dimensions to prevent said actuating arm to be brought closer than a predetermined angular position with respect to said moving plate thereby avoiding injury to a user's fingers.

10. The press set forth in claim 9 wherein said moving plate includes at least one tab extending outwardly from the periphery of said moving plate.

* * * * *